H. W. TAYLOR.
COTTON PICKER.
APPLICATION FILED SEPT. 23, 1920.

1,423,472.

Patented July 18, 1922.
2 SHEETS—SHEET 1.

Inventor
Hubert W. Taylor,
By ...
Attorney

H. W. TAYLOR.
COTTON PICKER.
APPLICATION FILED SEPT. 23, 1920.
1,423,472.
Patented July 18, 1922.
2 SHEETS—SHEET 2.
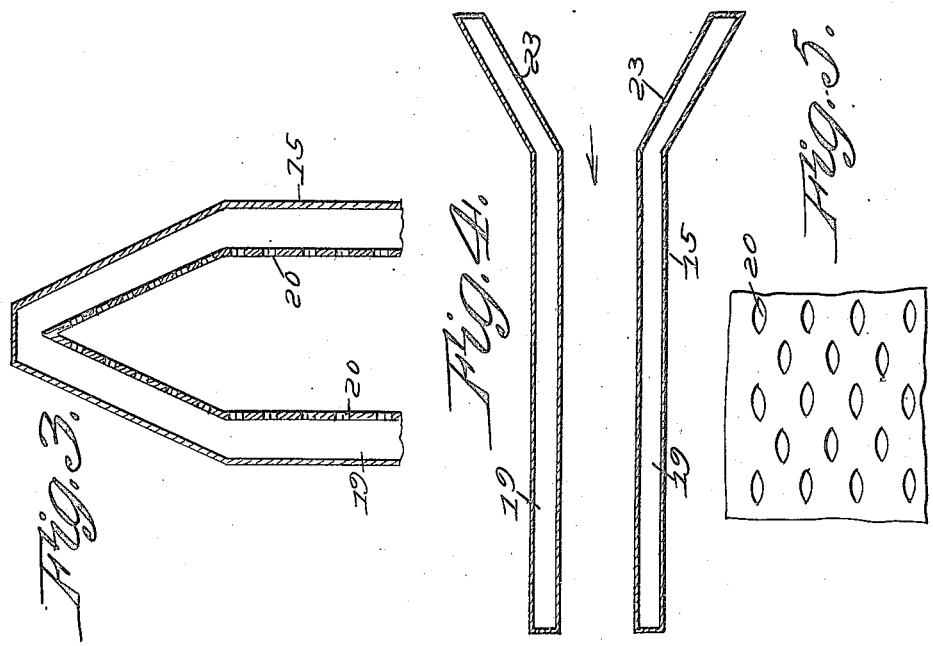
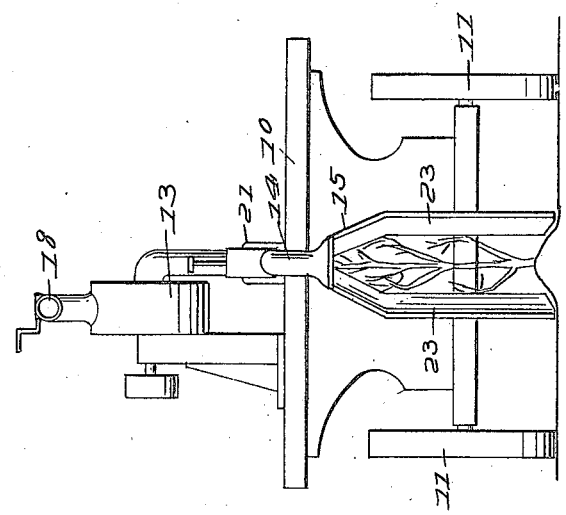

UNITED STATES PATENT OFFICE.

HUBERT W. TAYLOR, OF FREDERICK, OKLAHOMA.

COTTON PICKER.

1,423,472. Specification of Letters Patent. Patented July 18, 1922.

Application filed September 23, 1920. Serial No. 412,163.

*To all whom it may concern:*

Be it known that I, HUBERT W. TAYLOR, a citizen of the United States, residing at Frederick, in the county of Tillman and State of Oklahoma, have invented new and useful Improvements in Cotton Pickers, of which the following is a specification.

The object of the invention is to provide a simple and efficient means whereby cotton may be picked from the stalks or plants under conditions which will minimize the injury to the plants and the gathering of dead leaves, stems or other objectionable portions of the plants, while ensuring a substantially complete separation of the desirable product and under conditions which will minimize the labor and the time necessary to be devoted to that work, and with these objects in view, the invention consists in the construction and combination of parts, of which a preferred embodiment is shown in the accompanying drawings, wherein:—

Figure 2, is a front view of the same.

Figure 3, is a transverse sectional view of the suction hood.

Figure 4, is a horizontal sectional view of the same.

Figure 5, is a detail elevational view of a portion of the perforated inner wall of the suction hood.

Figure 1:
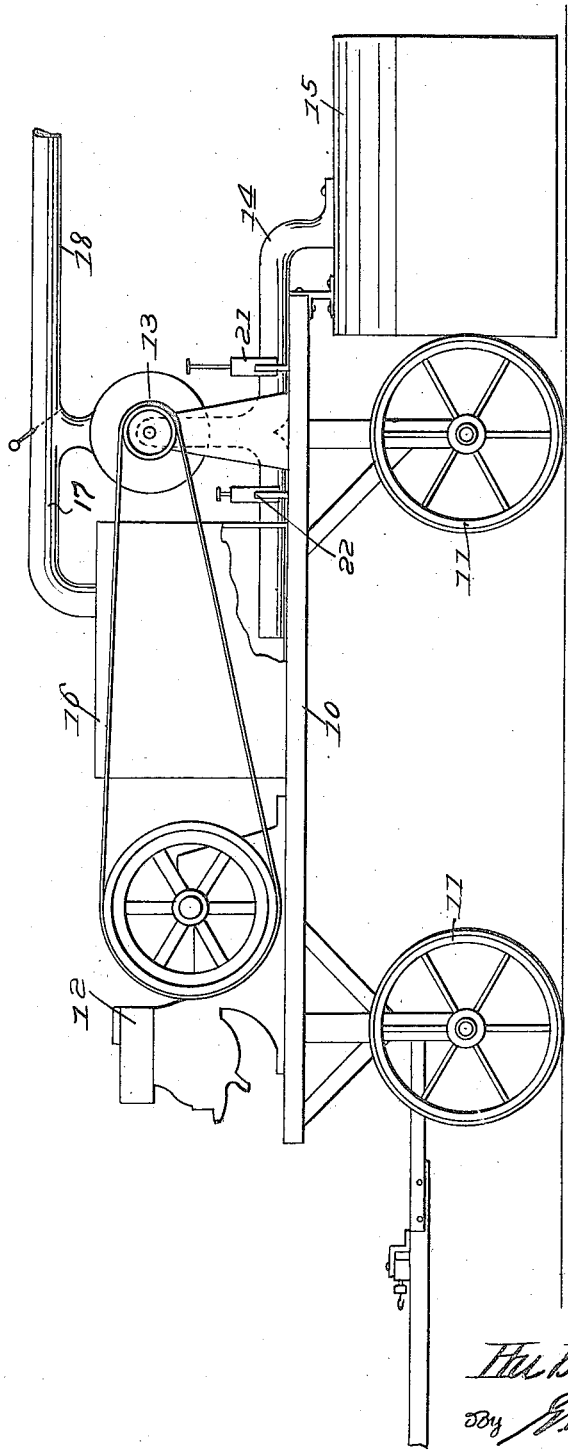
Figure 1, is a side view of a cotton harvester embodying the invention.

The truck or frame 10 may, as indicated, be wheel-supported as shown at 11 and while it may be either tractor or horse drawn, it preferably supports a motor 12 of the ordinary explosive or similar type for the operation of a suction fan 13 for effecting a sufficiently forcible current of air through either of a series of conductors indicated therewith, one of said conductors as shown at 14 extending over a suction nozzle or hood 15, communicating with the fan and extending to a receiving box 16 and another of said conductors as shown at 17 extending from the receiving box to the fan casing and terminating in a conductor 18 which may be connected with the discharge into the storage pit. The latter conductor for convenience may be termed the discharge conductor and the former the inlet conductor.

The machine is adapted to be moved in a direction parallel with the rows of cotton plants and may be equipped to operate upon one or more rows at the same time, such equipment depending upon the number of suction nozzles or hoods 15 which may be provided and each hood preferably consists of an elongated transversely arched box as shown particularly in Figures 3 and 4 of which the hollow side members 19 depend almost to the level of the soil on the opposite sides of the plane of the row of plants to be treated, the inner sides of said walls being perforated as shown at 20 to provide horizontally elongated openings which in practice have been found effective in stripping the cotton from the burrs while holding the burrs on the sides so that any loose leaves will readily be detached or dropped to the ground after the cotton has been drawn through the openings.

Obviously the cotton thus introduced into the hood is drawn through the conductor 14 and deposited in the receiving box from which latter it may be discharged when it is necessary to unload the machine, the conductor 14 being provided on opposite sides of the fan with valves 21 and 22 of which the latter should be closed during the gathering of the cotton, while the former should be closing during the unloading operation, said valves being reversed in position respectively in the operations of collecting and discharging the cotton.

The forward end of the hood is preferably provided with forwardly deflected walled portions 23 to ensure the effective reception of the plants there-between and the inner surfaces of the hollow walls of the hood are disposed at such intervals as to transversely compress the branches of the plants so as to bring the effect of the suction produced by the fan into effective relation with the parts of the plants to ensure a substantially complete removal of all cotton from the stems or bolls.

The invention having been described, what is claimed as new and useful is:—

A cotton harvesting machine having a truck and motor actuated suction fan supported thereby, a transversely arched suction hood, a receiving box mounted on the truck, a discharge conductor connected with the receiving box, an inlet conductor extending from the suction hood to the receiving box and in communication with the fan at an intermediate point, and valves disposed in the inlet conductor on either side of the point of connection with the fan for the purpose specified.

In testimony whereof he affixes his signature.

HUBERT W. TAYLOR.